US012584885B2

(12) United States Patent
Kim et al.

(10) Patent No.: US 12,584,885 B2
(45) Date of Patent: Mar. 24, 2026

(54) MATERIAL MEASURING DEVICE, MATERIAL MEASURING SYSTEM AND MATERIAL MEASURING METHOD

(71) Applicant: DAEGU GYEONGBUK INSTITUTE OF SCIENCE AND TECHNOLOGY, Daegu (KR)

(72) Inventors: Hoe Joon Kim, Seoul (KR); Il Ryu Jang, Daegu (KR); Soon In Jung, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 286 days.

(21) Appl. No.: 18/279,964

(22) PCT Filed: Nov. 26, 2021

(86) PCT No.: PCT/KR2021/017590
§ 371 (c)(1),
(2) Date: Sep. 1, 2023

(87) PCT Pub. No.: WO2022/186453
PCT Pub. Date: Sep. 9, 2022

(65) Prior Publication Data
US 2024/0159709 A1      May 16, 2024

(30) Foreign Application Priority Data
Mar. 5, 2021      (KR) ........................ 10-2021-0029183

(51) Int. Cl.
*G01N 29/02*          (2006.01)
*G01N 29/036*          (2006.01)
(Continued)

(52) U.S. Cl.
CPC ......... *G01N 29/022* (2013.01); *G01N 29/036* (2013.01); *G01N 29/2437* (2013.01);
(Continued)

(58) Field of Classification Search
CPC .............. G01N 29/022; G01N 29/036; G01N 29/2437; G01N 29/326; G01N 2291/014;
(Continued)

(56) References Cited

U.S. PATENT DOCUMENTS 5,012,668 A * 5/1991 Haworth .............. G01N 29/022
73/24.06
2012/0234818 A1 9/2012 Martin et al.
(Continued)

FOREIGN PATENT DOCUMENTS

JP          05-090866 A      4/1993
JP          08-334330 A      12/1996
(Continued)

OTHER PUBLICATIONS

International Search Report for PCT/KR2021/017590 dated Jun. 8, 2022 (PCT/ISA/210).

*Primary Examiner* — Francis C Gray
(74) *Attorney, Agent, or Firm* — Sughrue Mion, PLLC

(57)          ABSTRACT

The present invention relates to a surface acoustic wave-based material measuring device, material measuring system, and material measuring method, and more particularly, to a technique of accurately and reliably measuring various inherent physical properties of temperature and frequency-dependent materials by generating multiple resonant waves.

16 Claims, 4 Drawing Sheets

(51) Int. Cl.
    *G01N 29/24*        (2006.01)
    *G01N 29/32*        (2006.01)

(52) U.S. Cl.
    CPC ..... *G01N 29/326* (2013.01); *G01N 2291/014*
              (2013.01); *G01N 2291/02881* (2013.01)

(58) Field of Classification Search
    CPC ......... G01N 2291/02881; G01N 29/02; G01N
              29/24; G01N 29/32; G01N 29/44
    See application file for complete search history.

(56)              References Cited

U.S. PATENT DOCUMENTS

| | | | | |
|---|---|---|---|---|
| 2022/0074894 A1* | 3/2022 | Serino | ................. | G01N 33/559 |
| 2023/0296563 A1* | 9/2023 | Yang | .................... | G01N 29/022 |
| | | | | 73/64.53 |

FOREIGN PATENT DOCUMENTS

| | | | | |
|---|---|---|---|---|
| JP | H08334330 | A | * | 12/1996 |
| JP | 2003-532056 | A | | 10/2003 |
| JP | 2010-263388 | A | | 11/2010 |
| JP | 2014190815 | A | * | 10/2014 |
| KR | 10-1087438 | B1 | | 11/2011 |
| KR | 10-2012-0043853 | A | | 5/2012 |
| WO | 2020/049170 | A1 | | 3/2020 |

* cited by examiner

MATERIAL MEASURING DEVICE, MATERIAL MEASURING SYSTEM AND MATERIAL MEASURING METHOD

CROSS REFERENCE TO RELATED APPLICATIONS

This application is a National Stage of International Application No. PCT/KR2021/017590 filed Nov. 26, 2021, claiming priority based on Korean Patent Application No. 10-2021-0029183 filed Mar. 5, 2021.

TECHNICAL FIELD

The present invention relates to a surface acoustic wave-based material measuring device, system, and method thereof, and more particularly, to a technique for measuring various inherent physical properties of materials using surface acoustic waves having multiple resonance frequencies.

BACKGROUND ART

In surface acoustic wave (SAW)-based material measurement sensors, crossed comb-shaped electrodes excite a piezoelectric substrate to generate a surface acoustic wave. These material measurement sensors have been used in various fields, such as biological properties and chemical reaction analysis, based on very high resolution and sensitivity.

In such a surface acoustic wave-based material measurement sensor, when an AC signal is applied to a pair of crossed comb-shaped electrodes, an electric field is formed by a piezoelectric material between another pair of comb-shaped electrodes that are symmetrical in opposite positions. When a material to be measured approaches the electric field, the physical properties of a piezoelectric substrate change, and accordingly, the frequency of the surface acoustic wave generated by the piezoelectric substrate changes. A signal detecting unit may measure unique properties of a material by detecting a change in frequency.

However, since a conventional material measurement sensor has only one resonance frequency, there is a major problem in that inherent physical properties of a material that may be measured are limited.

Moreover, when measuring a particle-shaped measurement object 10 according to the temperature and humidity of a surrounding environment, in particular, chemical materials that are sensitive to temperature, physical property values, such as density, stiffness, and elasticity change according to a change in temperature. In this case, depending on the temperature of a location to be measured, measurement values of even the same material are calculated to be different, thereby degrading sensing reliability. In addition, when particles containing water are brought into contact with the surface of the piezoelectric substrate 100, the surface acoustic wave is attenuated by an interface formed between water and the surface of the piezoelectric substrate 100, resulting in a decrease in sensing reliability.

RELATED ART DOCUMENT

Korean Patent No. 1087438 (2011.11.21)

DISCLOSURE

Technical Problem

An object of the present invention is to calculate characteristics of various physical properties according to a temperature of a measurement object, while multiple resonance frequencies are generated.

Technical Solution

In one general aspect, a particle material measuring device includes: a piezoelectric substrate including a sensing region; and first to n-th electrode modules provided on one surface of the piezoelectric substrate, wherein each of the first to n-th electrode modules includes first and second comb electrodes that are a comb-shaped electrode pair opposing each other based on the sensing region, and the piezoelectric substrate is formed of a piezoelectric material that is excited by the first to n-th electrode modules to generate a surface acoustic wave (where n is a natural number greater than 1).

A gap between the first and second comb electrodes of any one of the first to n-th electrode modules may be greater or smaller than a gap between the first and second comb electrodes of another of the first to n-th electrode modules so that the first to n-th electrode modules generate a surface acoustic wave having multiple resonance frequencies.

The first to n-th electrode modules may be radially arranged around the sensing region.

Each of the first to n-th electrode modules may include first and second reflective portions, and the first and second reflective portions may be disposed behind the first and second comb electrodes based on the sensing region, may reflect the surface acoustic wave in a direction parallel to a traveling direction of a surface acoustic wave excited by the first and second comb electrodes, and may be formed of a plurality of diffraction gratings.

The particle material measuring device may further include: at least one heating unit including a heating wire heating a measurement object.

The heating unit may be provided on one surface of the piezoelectric substrate and include at least one heater module formed of at least one heating wire that is repeatedly formed in a zigzag shape to generate heat.

The heater module may have a structure in which a width of the zigzag shape increases in a direction away from the sensing region.

The heater module may include at least one thermistor element.

The particle material measuring device may further include: at least one cooling unit provided on at least one of one surface and the other surface of the piezoelectric substrate and including a thermoelectric element cooling a measurement object.

In another general aspect, a particle material measuring system includes: the particle material measuring device described above; a power supply module supplying power to at least one of the first to n-th electrode modules; and a signal processing module receiving a signal from at least one of the first to n-th electrode modules and calculating physical properties of a measurement object provided in the sensing region, wherein the piezoelectric substrate is excited by the first to n-th electrode modules to generate a surface acoustic wave having multiple resonance frequencies.

The power supply module may be connected to at least one of each of the first and second comb electrodes and the signal processing module to apply a direct current (DC) or alternating current (AC) voltage.

The particle material measuring system may further include: a heating unit including a heating wire heating the measurement object, wherein the power supply module supplies power to the heating unit.

The signal processing module may directly vary a temperature of the heating unit or indirectly vary a temperature of the heating unit by controlling power supplied to the heating unit by the power supply module, and calculate physical properties of the measurement object according to the changed temperature.

The signal processing module may measure a frequency of a surface acoustic wave generated by the piezoelectric substrate based on a signal received from at least one of the first to n-th electrode modules, and directly or indirectly control a temperature of the heating unit to control a frequency of the surface acoustic wave.

In another general aspect, a particle material measuring method using the system described above, wherein the signal processing module includes: (a) controlling the power supply module connected to the heating unit so that the heating unit reaches a predetermined temperature; (b) controlling the power supply module so that power is applied to at least one of the first to n-th electrode modules; (c) receiving a sensing signal from at least one of the first to n-th electrode modules; and (d) calculating physical properties of a measurement object provided in the sensing region based on the sensing signal.

The particle material measuring method may further include, between (b) and (c), (e) measuring a frequency of a surface acoustic wave having multiple resonance frequencies generated by the piezoelectric substrate excited by the first to n-th electrode modules; and (f) controlling the heating unit to vary the frequency of the surface acoustic wave.

In (f), when the frequency of the surface acoustic wave measured in (e) is lower than a command frequency, the temperature of the heating unit is controlled to increase, and when the frequency of the surface acoustic wave is higher than the command frequency, the temperature of the heating unit is controlled to decrease.

Advantageous Effects

The present invention may accurately and reliably measure various inherent physical properties of temperature- and frequency-dependent materials by generating multi-resonant waves.

In addition, a surface acoustic wave having a plurality of resonance frequencies may be generated by including a plurality of pairs of comb electrodes, and thus, specific and various physical properties, such as quantitative size, mass, and shape, may be calculated, compared to a surface acoustic wave having a single resonance frequency.

BEST MODE

Hereinafter, the present invention will be described with reference to the accompanying drawings.

A surface acoustic wave-based material measurement sensor of the related art includes a pair of comb electrodes to generate a surface acoustic wave having a single resonance frequency. Since the surface acoustic wave is generated from a surface by a piezoelectric substrate, two surface acoustic waves respectively generated by the first and second comb electrodes arranged to oppose each other based on the sensing region overlap each other to generate a standing wave. When a measurement object approaches such a standing wave, the surface acoustic wave is distorted and frequency characteristics change. Physical properties, such as density, rigidity, elasticity, and viscosity of the measurement object may be calculated by measuring such a change in frequency characteristics.

A particle material measuring device according to an example of the present invention may include a plurality of pairs of comb electrodes and generate a surface acoustic wave having a plurality of resonance frequencies. When the measurement object approaches a sensing region in which surface acoustic waves having multiple resonance frequencies are generated, more specific and diverse physical properties, such as a quantitative size, mass, and shape may be calculated compared to a surface acoustic wave having a single resonance frequency. The present invention will be described in detail with reference to the drawings below.

Figure 1:
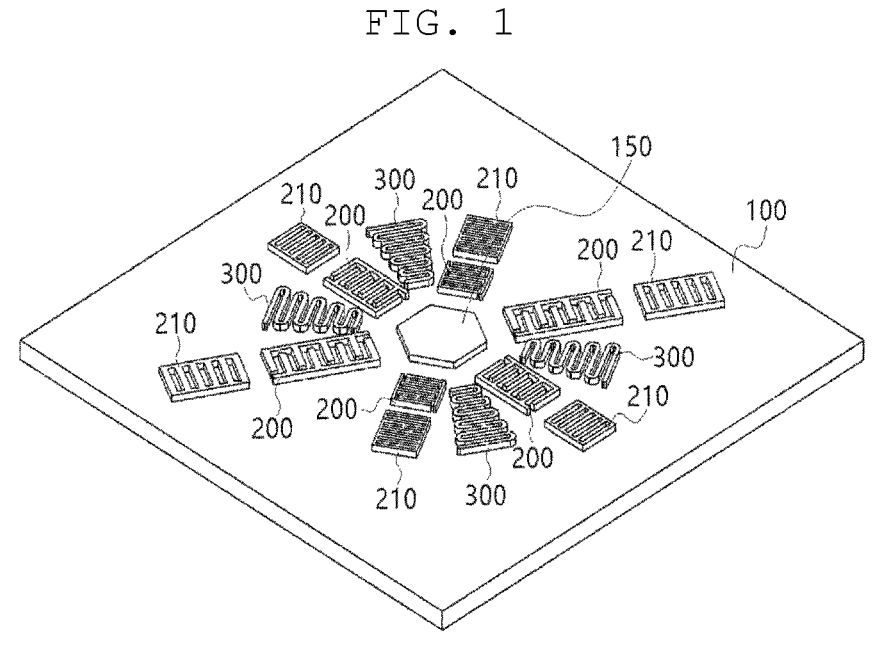
FIG. 1 is a perspective view of a particle material measuring device according to an exemplary embodiment of the present invention.
Figure 2:
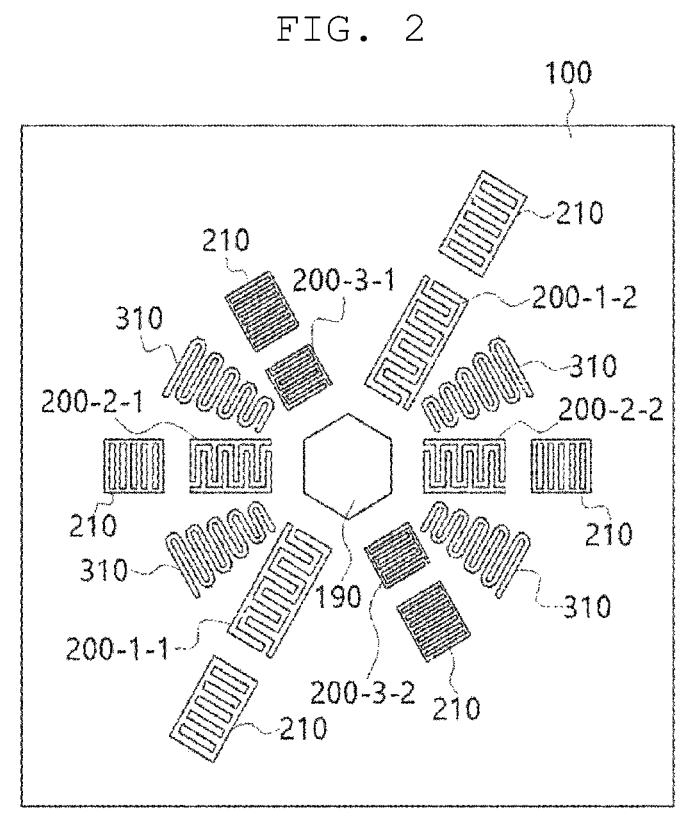
FIG. 2 is a plan view of FIG. 1.

FIG. 1 is a perspective view of a particle material measuring device according to an example of the present invention, and FIG. 2 is a plan view of FIG. 1. As shown, the particle material measuring device of the present invention largely includes a piezoelectric substrate 100 and first to n-th electrode modules 200.

The piezoelectric substrate 100 includes a sensing region 150, and the first to n-th electrode modules 200 are provided on one surface of the piezoelectric substrate 100. The first to n-th electrode modules 200 oppose each other based on the sensing region 150 and include first and second comb electrodes (for example, 200-1-1 and 200-1-2) which are a comb-shaped electrode pair. In this case, the piezoelectric substrate 100 is formed of a piezoelectric material that is excited by the first to n-th electrode modules 200 to generate a surface acoustic wave, and n may be a natural number greater than 1.

Figure 3:
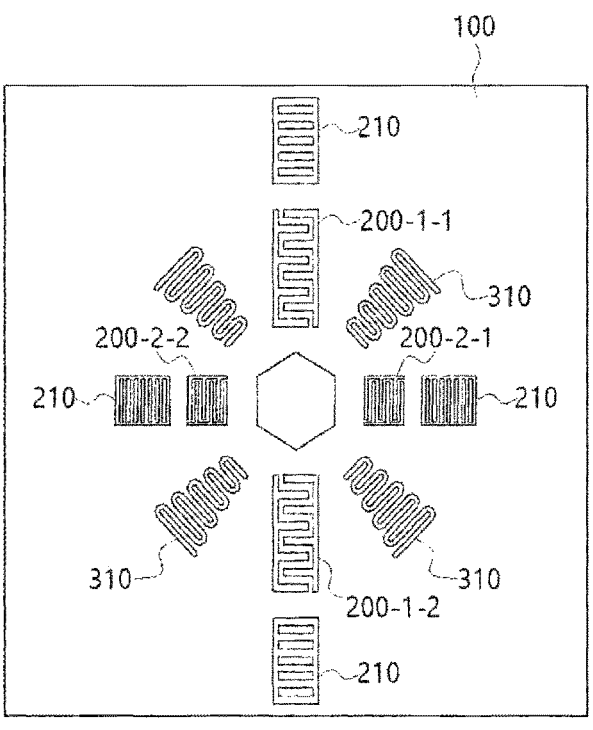
FIG. 3 is a plan view of a particle material measuring device according to another example of the present invention.

More specifically, referring to FIG. 2, the first electrode module 200-1 may include first and second comb electrodes 200-1-1 and 200-1-2, and similarly, the n-th electrode module 200-n may include first and second comb electrodes 200-n-1 and 200-n-2. Here, each of the first and second comb electrodes may be formed of electrodes having the same gap, the same material, and the same film thickness, and each comb electrode may be formed of a pair of comb-shaped electrodes including a plurality of electrode fingers. FIG. 2 illustrates three pairs of electrode modules with n=3, and FIG. 3 illustrates another exemplary embodiment of the particle material measuring device, illustrating two pairs of electrode modules with n=2.

One of each pair of comb-shaped electrodes may be connected to a signal terminal of a power supply module 500 described below, and the other may be connected to a ground terminal (not shown) to receive AC power to excite the piezoelectric substrate 100. The power supply module 500 may input the same or different AC power to each of the first to n-th electrode modules 200.

In addition, in the first to n-th electrode modules 200, a gap of the first and second comb electrodes of i-th electrode module, which is any one of the first to n-th electrode modules 200, may be formed to be greater or smaller than a gap of the first and second comb electrodes of j-th electrode module, which is another of the first to n-th electrode modules 200, so that a surface acoustic wave having multiple resonance frequencies may be generated. That is, n>1, n≥i≥1, n≥j≥1, and i≠j may be satisfied, and, in other words, gaps between the first to n-th electrode modules 200 may be configured to be different from each other.

Figure 4:
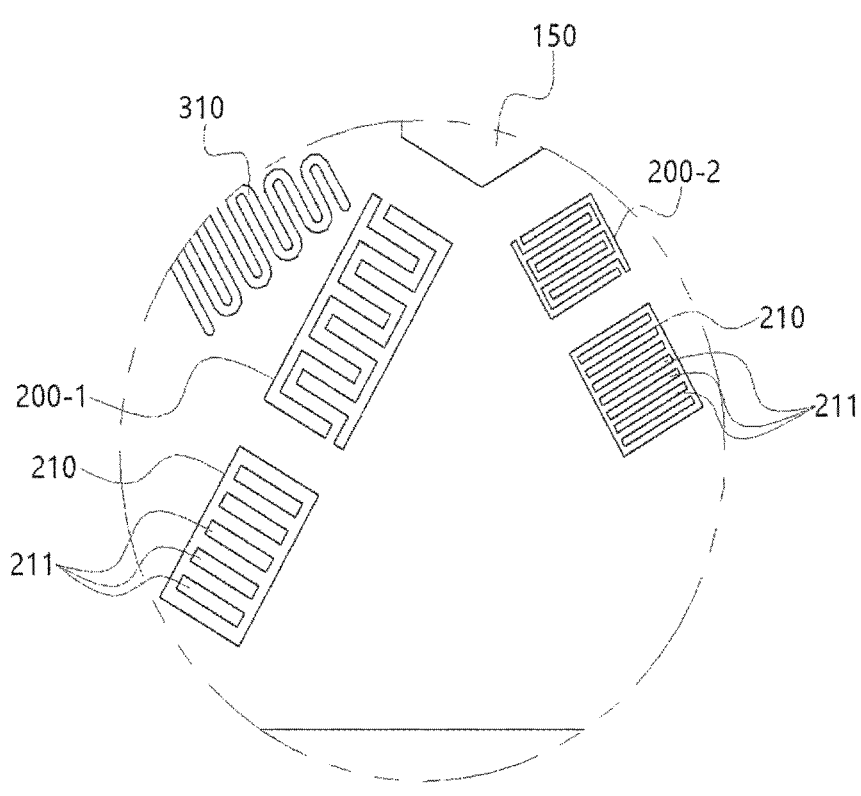
FIG. 4 is a partially enlarged view of a particle material measuring device according to an example of the present invention.

FIG. 4 is an enlarged view of a portion of the particle material measuring device according to an example of the present invention. As shown, the electrode modules may have different gaps, thereby generating resonance frequencies different from each other.

The number (i.e., n) of the first to n-th electrode modules 200 may be determined by the number of resonance frequencies to be generated. FIGS. 1 and 2 illustrate a device including n=3, that is, first to third electrode modules 200-1 to 200-3, in which case, when the first to third electrode modules 200-1 to 200-3 excite the piezoelectric substrate 100, surface acoustic waves having three resonance frequencies may be generated in the piezoelectric substrate 100. FIG. 3 illustrates a device including n=2, that is, the first and second electrode modules 200-1 and 200-2, in which case, when the first and second electrode modules 200-1 and 200-2 excites the piezoelectric substrate 100, surface acoustic waves having two resonance frequencies may be generated in the piezoelectric substrate 100. That is, the number of electrode modules 200 may be adjusted according to the number of resonance frequencies for measuring the physical properties of the particles of the measurement object 10. In addition, the gap between the first and second comb electrodes of each of the first to n-th electrode modules 200 may be adjusted according to a size of a resonance frequency to be generated.

As shown in FIGS. 2 and 3, the first to n-th electrode modules 200 may be radially arranged around the sensing region 150. Since surface acoustic waves generated from each of the first to n-th electrode modules 200 overlap in the sensing region 150 to generate standing waves, when the first to n-th electrode modules 200 are radially arranged around the sensing region 150, standing waves may be concentrated on the sensing region 150.

Meanwhile, each of the first to n-th electrode modules 200 may include first and second reflective portions 210. As shown in FIGS. 1 to 4, each of the first to n-th electrode modules 200 may include first and second reflective portions 210, and in this case, the first and second reflective portions 210 may be arranged behind the first and second comb electrodes based on the sensing region 150, may reflect the surface acoustic wave in a direction parallel to a traveling direction of the surface acoustic wave excited by the first and second comb electrodes, and may be formed of a plurality of diffraction gratings 211.

More specifically, referring to FIGS. 2 and 3, the first reflective portion 210 is disposed behind the first comb electrode 200-1-1 of the first electrode module based on the sensing region 150, and the second reflective portion 210 may be disposed behind the second comb electrode 200-1-2 of the first electrode module. In this manner, the reflective portion 210 may be disposed behind each comb electrode.

Also, the first and second reflective portions 210 may include a plurality of diffraction gratings 211 having the same period as that of half of a wavelength of the surface acoustic wave traveling toward the first and second reflective portions 210. Furthermore, electrode fingers of the first and second comb electrodes and the diffraction gratings of the first and second reflective portions 210 may include electrodes formed of the same material and having the same film thickness. This may reduce energy loss by attenuating a reflected wave generated when the surface acoustic wave is generated, and further isolate the generated surface acoustic wave.

The electrode design proposed in the present invention is a design in which the surface acoustic wave may be formed in a region between facing comb electrodes. In addition, since no other electrode exists in the region between the comb electrodes, surface acoustic wave interference between the electrode modules may be minimized by separately driving each electrode module.

Meanwhile, as described above, when measuring the particle-shaped measurement object 10, especially, when the measurement object 10 is a chemical substance, since the chemical substance is sensitive to temperature, physical property values, such as density, rigidity, and elasticity change according to a change in temperature. In this case, even the same material may have a measurement value calculated to be different according to the temperature of a location for measurement. In addition, when the particles containing water come into contact with the surface of the piezoelectric substrate 100, the surface acoustic wave is attenuated by an interface formed between water and the surface of the piezoelectric substrate 100, resulting in a decrease in sensing reliability.

In order to solve this problem, the present invention may provide a heating unit 300 for heating the measurement object 10. The temperature of the measurement object 10 may be adjusted to a certain temperature through the heating unit 300, and moisture may be removed by heating the measurement object 10, thereby increasing sensing reliability.

That is, the material measuring device according to an example of the present invention may further include at least one heating unit 300, and in this case, the heating unit 300 may be provided on one surface of the piezoelectric substrate 100 and may include a heating wire heating the measurement object 10. More specifically, referring to FIGS. 1 to 3, the heating unit 300 may include at least one heater module 310 including at least one heating wire that is repeatedly formed in a zigzag shape to generate heat, and the heater module 310 may be provided on one surface of the piezoelectric substrate 100.

As a thickness of the piezoelectric substrate 100 increases or the amount of particles of the measurement object 10 increases, more power is required for the heater module 310 to heat the measurement object 10 to reach a command temperature. In this case, power consumption may increase to increase power waste, a structure of the heater module 310 capable of efficiently heating the measurement object 10 is required.

As shown in FIGS. 2 and 3, the heater module 310 of the present invention may have a structure in which a width of the zigzag shape increases in a direction away from the sensing region 150. In addition, the heater module 310 may be installed at regular intervals between the first to n-th electrode modules 200 in a location close to the sensing region 150. According to this configuration, the measurement object 10 may be heated more effectively than in a case in which the heater module 310 is disposed in a location not close to the sensing region 150 or disposed on the other surface of the piezoelectric substrate 100. In addition, by disposing the heater module 310 between each of the first to n-th electrode modules 200, heat may be concentrated on the sensing region 150, and by configuring the heating wire such that the three-dimensional zigzag shape and the rear width increase, the escape of heat from the sensing region 150 may be minimized.

Also, the heater module 310 may include at least one thermistor element. The thermistor element may heat the measurement object 10 and simultaneously perform a function of a temperature sensor for measuring the temperature of the measurement object 10. A signal processing module 600 to be described below may monitor the temperature of the measurement object 10 measured by the thermistor element and control the heater module 310 to heat the measurement object 10 to a user's input or a preset command temperature.

As described above, according to the present invention, since the physical properties of the particles included in the measurement object 10 may be measured after heating the measurement object 10 to the command temperature, deterioration of sensing reliability due to a change in temperature, which is a problem of the surface acoustic wave-based material measuring device of the related art, may be prevented, and since moisture included in the measurement object 10 may also be evaporated, deterioration of sensing reliability due to moisture may also be prevented. In addition, by measuring properties of temperature-dependent materials at high temperatures for each temperature, it may be helpful in accumulating data on physical properties and changes in properties according to temperature. In addition, providing the heating unit on the same surface as the piezoelectric substrate may be advantageous in terms of the manufacturing process and has an advantageous effect in terms of heat transfer.

Furthermore, since the object may be measured while maintaining a constant temperature, the sensing reliability may increase and the size of the object may be analyzed with micrometer and nanometer precision.

Figure 5:
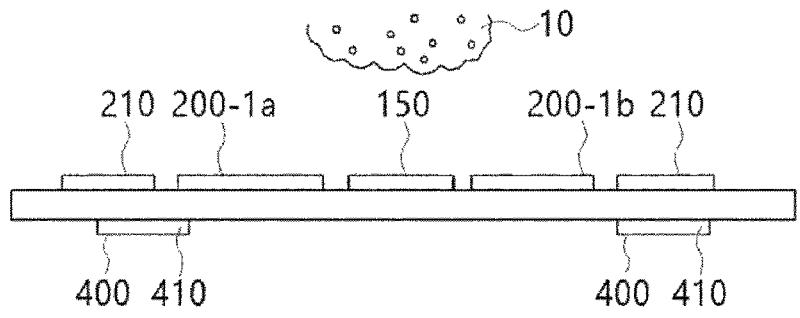
FIG. 5 is a side view of a particle material measuring device according to an example of the present invention.

FIG. 5 is a side view of a particle material measuring device according to an example of the present invention. As shown, the present invention may further include a cooling unit 400 for cooling the measurement object 10. The cooling unit 400 may be provided on at least one of one surface and the other surface of the piezoelectric substrate 100 and may include a thermoelectric element 410 for cooling the measurement object 10. The thermoelectric element 410 may cool the measurement object 10 by using heat absorption or heat release by the Peltier effect.

Accordingly, it may help to accumulate data on not only the amount of physical property changes according to the temperature of materials at high temperatures, but also the amount of change in physical properties and characteristics according to the temperature of materials even at low temperatures. In addition, since the cooling unit 400 may be manufactured using a semiconductor process, it may be advantageous in terms of the manufacturing process.

Figure 6:
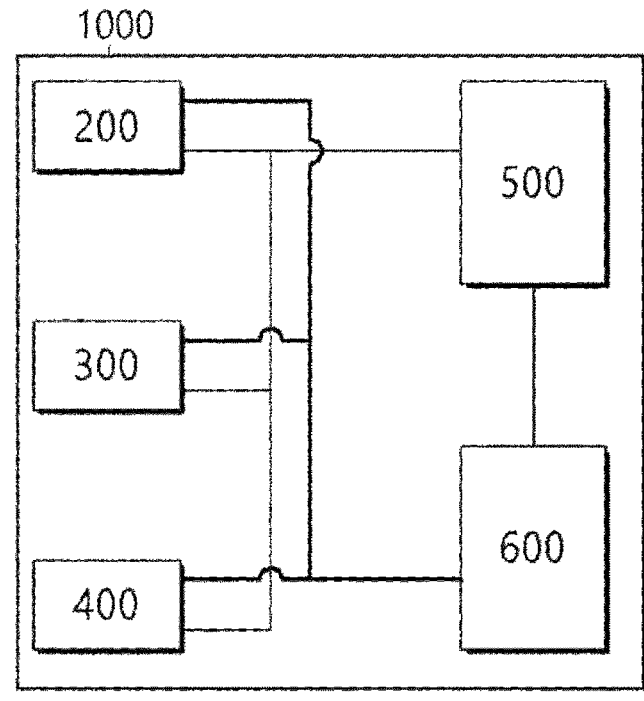
FIG. 6 is a block diagram of a particle material measuring system according to an example of the present invention.

FIG. 6 is a block diagram of a particle material measuring system according to an exemplary embodiment of the present invention. As shown, the system 100 of the present invention may include the particle material measuring device described above, that is, the device including the first to n-th electrode modules 200, the heating unit 300, and the cooling unit 400, the power supply module 500 supplying power to at least one of the first to n-th electrode modules, and the signal processing module 600 receiving a signal from at least one of the first to n-th electrode modules 200 and calculating physical properties of the measurement object 10 provided in the sensing region 150.

The power supply module 500 may be connected to at least one of the first and second comb electrodes and the signal processing module 600 to apply a DC or AC voltage and supply power to the heating unit 300.

The signal processing module 600 may directly vary the temperature of the heating unit 300 or indirectly vary the temperature of the heating unit 300 by controlling power supplied to the heating unit 300 from the power supply module 500, and calculate the physical properties of the measurement object 10 according to the temperature varied at high temperatures.

In addition, the signal processing module 600 may directly vary the temperature of the cooling unit 400 or indirectly vary the temperature of the heating unit 300 by controlling power supplied to the cooling unit 400 from the power supply module 500 and calculate the physical properties of the measurement object 10 according to the temperature varied at low temperatures.

In addition, the signal processing module 600 may monitor the temperature measured by the thermistor element of the heating unit 300 in real time, may compare the temperature of the measurement object 10 measured by the thermistor element with the user's input or preset command temperature, and may directly or indirectly control at least one of the heating unit 300 and the cooling unit 400 so that the measured temperature reaches the command temperature.

For example, when the temperature measured by the thermistor element is higher than the command temperature, the signal processing module 600 may decrease the output of the heating unit 300 or the output of power supplied by the power supply module 500 to the heating unit 300 or may increase the output of the cooling unit 400 or the output of power supplied to the cooling unit 400 from the power supply module 500. Conversely, when the temperature measured by the thermistor element is lower than the command temperature, the signal processing module 600 may increase the output of the heating unit 300 or the output of power supplied by the power supply module 500 to the heating unit 300 or may decrease the output of the cooling unit 400 or the output of power supplied to the cooling unit 400 from the power supply module 500.

In addition, the signal processing module 600 may measure a frequency of the surface acoustic wave generated by the piezoelectric substrate 100 based on a signal received from at least one of the first to n-th electrode modules 200, and control the frequency of the surface acoustic wave by directly or indirectly controlling the temperature of at least one of the heating unit 300 and the cooling unit 400.

Since the piezoelectric substrate 100 vibrates according to an intrinsic elastic constant and the temperature of a connection point, the resonance frequency of the surface acoustic wave generated according to the temperature may partially change even with the comb electrode having the same gap. Accordingly, by adjusting the temperature by the signal processing module 600 using the heating unit 300 and the cooling unit 400, the resonance frequency of the surface acoustic wave may be partially adjusted.

In addition, the signal processing module 600 may include a correction equation or table in which the correlation between the temperature measured by the thermistor element and the resonance frequency is stored, and when a user's input or a preset resonance frequency is determined, the signal processing module 600 may adjust the temperature by directly or indirectly controlling the heating unit 300 and the cooling unit 400 based on the correction equation or the table, thereby partially adjusting the resonance frequency of the surface acoustic wave. For example, the signal processing module 600 may control to increase the temperature of the heating unit when the measured frequency of the surface acoustic wave is lower than the command frequency, and control to decrease the temperature of the heating unit when the frequency of the surface acoustic wave is higher than the command frequency.

Hereinafter, a particle material measuring method according to an example of the present invention will be described. The particle material measuring method of the present invention uses the particle material measuring system described above, in which the signal processing module includes: (a) controlling the power supply module connected to the heating unit so that the heating unit reaches a predetermined temperature; (b) controlling the power supply module so that power is applied to at least one of the first to n-th electrode modules; (c) receiving a sensing signal from at least one of the first to n-th electrode modules; and (d) calculating physical properties of a measurement object provided in the sensing region based on the sensing signal.

Here, the particle material measuring method may further include, between (b) and (c), (e) measuring a frequency of a surface acoustic wave having multiple resonance frequencies generated by the piezoelectric substrate excited by the first to n-th electrode modules; and (f) controlling the heating unit to vary the frequency of the surface acoustic wave.

In (f), when the frequency of the surface acoustic wave measured in (e) is lower than a command frequency, the temperature of the heating unit is controlled to increase, and when the frequency of the surface acoustic wave is higher than the command frequency, the temperature of the heating unit is controlled to decrease.

When the operating resonance frequency of the sensor increases, bonding force between the sensor and the particles weakens. In addition, as the size of the particles increases, the inertia of the particles increases, and thus, the bonding force weakens because the particles cannot follow the movement of the rapidly vibrating sensor. A surface acoustic wave sensor varies electrical response characteristics of the sensor according to bonding force with deposited particles. Therefore, the size of the sensing particles may be calculated by analyzing the electrical response characteristics for each resonance frequency with the inventive sensor.

In addition, an efficient sensor may be manufactured by selectively applying a sensing material to the sensing region 150 using electrostatic spray. An electrostatic spray system is equipment that applies a high voltage to a working fluid to rupture it into micrometer-scale droplets. By grounding the sensing region of the sensor, an electric field may be formed to induce a charged liquid droplet to selectively fall on the sensing region. Using this system, it is possible to selectively apply a sensing material to a small region less than 1 mm and a precise material coating at the level of several nanograms is possible. In addition, compared to existing drop casting and dip coating material application methods, a solute coffee ring effect or material aggregation phenomenon occurring during a solution process may be improved so that a sensing material may be uniformly applied.

The present invention is not limited to the above exemplary embodiments, and the scope of application is diverse, and various modifications and implementations are possible without departing from the gist of the present invention claimed in the claims.

DETAILED DESCRIPTION OF MAIN ELEMENT

10: measurement object
100: piezoelectric substrate
150: sensing region
200: first to n-th electrode modules
210: first and second reflective portions
211: diffraction grating
300: heating unit
310: heater module
311: heating wire
400: cooling unit
410: thermoelectric element
500: power supply module
600: signal processing module
1000: particle material measuring system

The invention claimed is:

1. A particle material measuring device comprising:
a piezoelectric substrate including a sensing region; and
first to n-th electrode modules provided on one surface of the piezoelectric substrate,
wherein each of the first to n-th electrode modules includes first and second comb electrodes that are a comb-shaped electrode pair opposing each other based on the sensing region, and
the piezoelectric substrate is formed of a piezoelectric material that is excited by the first to n-th electrode modules to generate a surface acoustic wave (where n is a natural number greater than 1),
wherein the first to n-th electrode modules are radially arranged around the sensing region.

2. The particle material measuring device of claim 1, wherein
a gap between the first and second comb electrodes of any one of the first to n-th electrode modules is greater or smaller than a gap between the first and second comb electrodes of another of the first to n-th electrode modules so that the first to n-th electrode modules generate a surface acoustic wave having multiple resonance frequencies.

3. The particle material measuring device of claim 1, wherein
each of the first to n-th electrode modules includes first and second reflective portions, and
the first and second reflective portions are disposed behind the first and second comb electrodes based on the sensing region, reflect the surface acoustic wave in a direction parallel to a traveling direction of a surface acoustic wave excited by the first and second comb electrodes, and are formed of a plurality of diffraction gratings.

4. The particle material measuring device of claim 1, further comprising:
at least one heating unit including a heating wire heating a measurement object.

5. The particle material measuring device of claim 4, wherein
the heating unit is provided on one surface of the piezoelectric substrate and includes at least one heater module formed of at least one heating wire that is repeatedly formed in a zigzag shape to generate heat.

6. The particle material measuring device of claim 5, wherein
    the heater module has a structure in which a width of the zigzag shape increases in a direction away from the sensing region.

7. The particle material measuring device of claim 5, wherein
    the heater module includes at least one thermistor element.

8. The particle material measuring device of claim 1, further comprising:
    at least one cooling unit provided on at least one of one surface and the other surface of the piezoelectric substrate and including a thermoelectric element cooling a measurement object.

9. A particle material measuring system comprising:
    the particle material measuring device comprising a piezoelectric substrate including a sensing region and first to n-th electrode modules provided on one surface of the piezoelectric substrate, wherein each of the first to n-th electrode modules includes first and second comb electrodes that are a comb-shaped electrode pair opposing each other based on the sensing region, and the piezoelectric substrate is formed of a piezoelectric material that is excited by the first to n-th electrode modules to generate a surface acoustic wave (where n is a natural number greater than 1);
    a power supply module supplying power to at least one of the first to n-th electrode modules; and
    a signal processing module receiving a signal from at least one of the first to n-th electrode modules and calculating physical properties of a measurement object provided in the sensing region,
    wherein
    the piezoelectric substrate is excited by the first to n-th electrode modules to generate a surface acoustic wave having multiple resonance frequencies.

10. The particle material measuring system of claim 9, wherein
    the power supply module is connected to at least one of each of the first and second comb electrodes and the signal processing module to apply a direct current (DC) or alternating current (AC) voltage.

11. The particle material measuring system of claim 9, further comprising:
    a heating unit including a heating wire heating the measurement object,
    wherein the power supply module supplies power to the heating unit.

12. The particle material measuring system of claim 11, wherein
    the signal processing module directly varies a temperature of the heating unit or indirectly varies a temperature of the heating unit by controlling power supplied to the heating unit by the power supply module, and calculates physical properties of the measurement object according to the changed temperature.

13. The particle material measuring system of claim 12, wherein
    the signal processing module measures a frequency of a surface acoustic wave generated by the piezoelectric substrate based on a signal received from at least one of the first to n-th electrode modules, and directly or indirectly controls a temperature of the heating unit to control a frequency of the surface acoustic wave.

14. A particle material measuring method using the system of claim 11, wherein the signal processing module includes:
    (a) controlling the power supply module connected to the heating unit so that the heating unit reaches a predetermined temperature;
    (b) controlling the power supply module so that power is applied to at least one of the first to n-th electrode modules;
    (c) receiving a sensing signal from at least one of the first to n-th electrode modules; and
    (d) calculating physical properties of a measurement object provided in the sensing region based on the sensing signal.

15. The particle material measuring method of claim 14, further comprising,
    between (b) and (c),
    (e) measuring a frequency of a surface acoustic wave having multiple resonance frequencies generated by the piezoelectric substrate excited by the first to n-th electrode modules; and
    (f) controlling the heating unit to vary the frequency of the surface acoustic wave.

16. The particle material measuring method of claim 15, wherein
    in (f),
    when the frequency of the surface acoustic wave measured in (e) is lower than a command frequency, the temperature of the heating unit is controlled to increase, and when the frequency of the surface acoustic wave is higher than the command frequency, the temperature of the heating unit is controlled to decrease.

* * * * *